United States Patent [19]

Echte et al.

[11] 4,421,895

[45] Dec. 20, 1983

[54] PROCESS FOR THE MANUFACTURE OF ABS POLYMERS AND USE THEREOF IN PREPARATION OF MOLDED PARTS

[75] Inventors: Adolf Echte, Ludwigshafen; Hermann Gausepohl, Neustadt; Karl Gerberding, Wachenheim, all of Fed. Rep. of Germany

[73] Assignee: BASF Aktiengesellschaft, Ludwigshafen, Fed. Rep. of Germany

[21] Appl. No.: 329,596

[22] Filed: Dec. 10, 1981

[51] Int. Cl.³ .......................................... C08F 279/04
[52] U.S. Cl. .................................... 525/53; 525/261; 525/316
[58] Field of Search .......................... 525/53, 261, 316

[56] References Cited

U.S. PATENT DOCUMENTS

| | | | |
|---|---|---|---|
| 3,859,388 | 1/1975 | Hill | 525/261 |
| 3,904,709 | 9/1975 | Morimoto | 525/316 |
| 3,945,976 | 3/1976 | McCurdy | 525/53 |
| 4,255,315 | 3/1981 | Anspon | 525/316 |
| 4,282,334 | 8/1981 | Walter | 525/53 |
| 4,315,083 | 2/1982 | Burk | 525/53 |

*Primary Examiner*—Paul R. Michl
*Attorney, Agent, or Firm*—Norbert M. Lisicki

[57] ABSTRACT

A process for making ABS polymer particles comprising continuous polymerization of a mixture of at least one of each of (a) an aromatic vinyl monomer, and (b) an ethylenically unsaturated monomer in a weight ratio of (a):(b) of 90:10 to 10:90 in the presence of at least one of each of (c) a rubber-like polymer in an amount of 3 to 35 percent by weight relative to the total weight of the monomers (a) and (b), (d) a solvent, (e) a radical initiator and (f) an optional chain transfer agent. The process is carried out at temperatures between 80° C. to 180° C. in two or more reaction zones while the reaction mixture is stirred and while the monomers and solvents are removed in a degassing zone. The rubber-like polymer (c) has a solution viscosity of less than 80 mPa.s and a ratio of the solution viscosity of (c) to a percent of solvent expressed by $100[(d)/(a+b+c+d)]$ equal to or less than 2.5 mPa.s/percent of solvent.

3 Claims, No Drawings

PROCESS FOR THE MANUFACTURE OF ABS POLYMERS AND USE THEREOF IN PREPARATION OF MOLDED PARTS

BACKGROUND OF THE INVENTION

1. Field of the Invention

This invention relates to a continuous process for producing acrylonitrile butadiene styrene polymers, i.e., ABS polymers in solution in the presence of a radical initiator in at least two reaction zones while being stirred. Mercaptans are optionally used as chain transfer agents.

2. Description of the Prior Art

The following references relate to the state of the art as discussed below: (1) German Published Application No. 21 35 348, (2) German Published Application No. 24 48 596, (3) U.S. Pat. No. 3,903,199 and (4) U.S. Pat. No. 3,903,200.

Efforts to manufacture ABS polymers of polymodal particle structure, as mentioned in references (3) and (4), or of exclusively small particle diameters in the flexible phase are known. Reference (2) relates to the use of mineral oil to achieve small particle diameters in the flexible phase, however, the softening point of the polymers produced by this method is greatly reduced. Reference (2) also relates to a mass suspension polymerization for an ABS polymer used for the manufacture of mixtures with polyesters. An ABS component particle size of 0.5 micron to 2.0 microns is said to be achieved. Particles of less than 1 micron diameter are achieved by using high initiator concentrations (Example 1) and high reaction rates (page 8), however, this process cannot be used for continuous solution polymerization since the high reaction rates result in sticking of the material to the reactor upon higher throughput.

An object of this invention was to find a continuous process which results in small ABS polymer particles.

SUMMARY OF THE INVENTION

This invention relates to a process for the manufacture of ABS polymers comprising continuous polymerization of a mixture of at least one of each of (a) an aromatic vinyl monomer and (b) an ethylenically unsaturated monomer in a weight ratio of (a):(b) of 90:10 to 10:90 in the presence of at least one of each of (c) 3 to 35 percent by weight, relative to the total weight of the monomers (a) and (b), of a rubber-like polymer (d) a solvent, (e) a radical initiator, and (f) optionally a chain transfer agent at a temperature from 80° C. to 180° C. in two or more reaction zones while the reaction mixture is stirred and while the monomers and solvents are removed in a degassing zone; wherein the rubber-like polymer (c) has a solution viscosity, measured in a 5 percent by weight solution in styrene at 25° C., of equal to or less than 80 mPa.s and a ratio of the solution viscosity of the rubber-like polymer (c) to a percent of solvent of the solvent (d), in percent by weight expressed by $100[d/a+b+c+d]$, equal to or less than 2.5 mPa.s/percent of solvent. This continuous polymerization process can produce particle sizes of less than 0.7 micron.

DESCRIPTION OF THE PREFERRED EMBODIMENTS

The expert is basically familiar with the continuous manufacture of ABS polymers in two or more reaction zones by reference to the manufacture of impact resistant polymers of styrene (compare also U.S. Pat. No. 3,243,481, vessel-tower cascade or vessel and horizontal reactor U.S. Pat. No. 3,903,202). The temperature range used during the process is from 80° C. to 180° C. and higher temperatures may be used in the degassing stage. The expert knows which temperatures are to be used in which reaction zone in order to obtain the desired products and product properties.

The process of this invention is carried out in at least two reactor zones each of which is operated on an isothermal basis. Thus, it is possible to carry out the process in two reaction zone vessels of different construction such as in one mixing vessel reactor and one tube reactor. However, the process of this invention is preferably implemented in more than two reaction zones, for instance, in a three tower cascade.

Vinyl aromatic monomers such as $\alpha$-methylstyrene, ortho, meta, para-methylstyrene or tertiary-butylstyrene may be used as the vinyl aromatic monomer (a) in implementing the process of this invention. Preferably used is styrene and/or mixtures of styrene and the above-mentioned vinyl aromatic monomers.

Useful as the ethylenically unsaturated monomer (b) are derivatives of acrylic or methacrylic acid of which at least one is used. Preferably, acrylonitrile is used alone. The ratio of the vinyl romatic monomer (a) to the ethylenically unsaturated monomer (b) in a mixture may be the weight ratio of 90:10 to 10:90. The preferred weight ratios of styrene to acrylonitrile is between about 60:40 and 90:10.

Useful as the rubber-like polymer (c) for the process of this invention are natural or synthetic rubbers based on butadiene or isoprene. Also suited are styrene-butadiene block copolymers. The rubber-like polymer must have solution viscosities of equal to or less than 80 mPa.s when measured in a 5 percent by weight solution in styrene at 25° C. The rubber-like polymer is used in an amount of 3 to 35 percent by weight relative to the total weight of monomers (a) and (b).

Suitable as the solvent (d) for the process of this invention are polar as well as nonpolar compounds or mixtures thereof. Preferably used are methylethyl ketone, toluene or ethylbenzene. The solvents may be used only in a concentration and percent by weight, relative to the mixture of a+b+c+d, such that the ratio of the solution viscosity of the rubber-like polymer (c) to a percent of solvent of the selected solvent and/or solvent mixture (d), expressed by $100[d/(a+b+c+d)]$, is equal to or less than 2.5 mPa.s per percent of solvent. Preferably, this ratio should be equal to or less than 2 mPa.s per percent of solvent. The type and maximum amount of solvent and thus the lower limit of viscosity to concentration are dependent upon expediency studies pertaining to energy and economic aspects. A generally valid lower limit cannot therefore be stated. However, one should not want to start with more than 80 percent solvent in the beginning. For a rubber of 80 mPa.s, the limit would then be 1 mPa.s per percent of solvent and for a rubber of 20 mPa.s the limit would be 0.28 mPa.s per percent of solvent.

Suitable as the radical initiator (e) are graft active peroxides, particularly preferably dibenzoyl peroxide, tertiary-butyl peroctoate and tertiary-butyl perbenzoate. The initiators are used in quantities of 0.02 to 0.5 percent by weight relative to the weight of monomers (a) and (b).

Mercaptans with 14 to 18 carbon atoms are suitable as chain transfer agents (f). Among the mercaptans, preferably n-butyl mercaptan, n-octyl mercaptan and n-n or tertiary dodecyl mercaptan are used. If mercaptans are used, they are normally used in an amount from 0.01 to 0.3 percent by weight relative to the weight of monomers (a) and (b).

Impact resistant styrene-acrylonitrile polymers, so-called ABS polymers, of a particle size less than 0.7 micron may be obtained by the continuous solution polymerization process of this invention. Lubricants and stabilizers which do not interfere with the polymerization may be used after dissolving the rubber-like polymer. Prior to processing the polymer produced in accordance with this process, other commonly used additives such as fillers may be added.

The molding materials produced in accordance with this invention may be processed by known thermoplastic processes. These include extrusion, injection molding, calendering, blow molding, pressing or sintering. Particularly preferred is the manufacture of molded parts from materials produced in accordance with the process of this invention by injection molding.

The ABS polymers produced in accordance with the method of this invention may also be used for mixing with other ABS polymers having other particle sizes.

The product properties listed in the examples and comparison tests were measured as follows:

1. The solution viscosity, SV, of the rubber-like polymer is measured in a 5 percent by weight solution in styrene at 25° C.
2. The average particle size of the flexible component phase is determined by electron micrograph.

The invention will be explained in greater detail by means of the following examples and comparison tests. Unless otherwise noted, all listed parts and percentages are relative to weight.

EXAMPLE 1

The following mixture was polymerized in a reaction cascade consisting of four reaction zones. The first two zones were stirred vessel reactors and the other two zones were polymerization towers.

11 parts of a styrene-butadiene block copolymer containing 25 percent by weight styrene (solution viscosity: 26 mPa.s),
59.25 parts of styrene
19.75 parts of acrylonitrile
0.2 part of dodecylmercaptan
12 parts of methylethyl ketone
0.075 part of t-butyl peroxybenzoate

|  | Parameter | Units |
|---|---|---|
| Reactor 1 | Volume | 3 liters |
|  | Temperature | 110° C. |
|  | Solids Content | 17.2% |
| Reactor 2 | Volume | 7 liters |
|  | Temperature | 121° C. |
|  | Solids Content | 27.8% |
| Reactor 3 | Volume | 10 liters |
|  | Temperature | 130° C. |
|  | Solids Content | 54.8% |
| Reactor 4 | Volume | 10 liters |
|  | Temperature | 144° C. |
|  | Solids Content | 80% |

The feed rate was 3.5 liters per hour.
The average particle size was 0.5 micron.

EXAMPLE 2

The following mixture was run through a reaction cascade with four polymerization zones at a feed rate of 10 liters per hour.

13 parts of a styrene-butadiene block copolymer (solution viscosity: 28 mPa.s)
65.25 parts of styrene
21.75 parts acrylonitrile
20 parts ethylbenzene
0.1 part t-butyl peroxybenzoate

|  |  | [Units] |
|---|---|---|
| Reactor 1 | Volume | 4 liters |
|  | Temperature | 104° C. |
|  | Solids Content | 17.5% |
| Reactor 2 | Volume | 16 liters |
|  | Temperature | 120° C. |
|  | Solids Content | 25% |
| Reactor 3 | Volume | 10 liters |
|  | Temperature | 135° C. |
|  | Solids Content | 45% |
| Reactor 4 | Volume | 10 liters |
|  | Temperature | 148° C. |
|  | Solids Content | 65% |

The particle size was 0.6 microns.

COMPARISON TEST A

Instead of the styrene-butadiene copolymer in Example 1, a polybutadiene having a solution viscosity of 93 mPa.s was used. Otherwise, the procedure was as that described in Example 1.

Result: After a short period, material adhered to reactors 2 and 3 resulting in a termination of the test.

COMPARISON TEST B

Instead of 12 parts of methylethyl ketone as described in Example 1, only 9 parts of the solvent were used. In this case also, the reaction had to be terminated as a result of the material sticking to the second reactor.

EXAMPLE 3

The mixture described in Example 1 was polymerized in a three-tower cascade. The throughput was 6 liter per hour.

|  |  | [Units] |
|---|---|---|
| Reactor 1 | Volume | 10 liters |
|  | Temperature | 110° C. |
|  | Solids Content | 26.5% |
| Reactor 2 | Volume | 10 liters |
|  | Temperature | 123° C. |
|  | Solids Content | 50.1% |
| Reactor 3 | Volume | 10 liters |
|  | Temperature | 145° C. |
|  | Solids Content | 80.2% |

The particle size was 0.6 micron.

The embodiments of the invention in which an exclusive property or privilege is claimed are defined as follows:

1. A process for the manufacture of acrylonitrile butadiene styrene polymer particles which comprises continually polymerizing a mixture of
   (a) styrene and
   (b) acrylonitrile, in a ratio of (a):(b) between 90:10 and 10:90 in the presence of (c) 3 to 35 percent by weight, relative to the weight of (a) and (b), of a styrene-butadiene block copolymer of solution viscosity, measured in a 5 percent by weight solution in styrene at 25° C., of equal to or less than 80 mPa.s,
   (d) a solvent selected from the group consisting of methylethyl ketone, toluene and ethylbenzene, wherein the ratio of the percent of solvent, expressed by $100[d/(a+b+c+d)]$ to the solution viscosity of (c) is greater than 0.4,
   (e) from 0.02 to 0.5 percent by weight, relative to the weight of (a) and (b), of a radical initiator selected from the group consisting of t-butyl peroxybenzoate, t-butyl peroctoate and dibenzoyl peroxide, at a temperature from 80° C. to 180° C. in two or more reaction zones; with stirring and removal of monomers and solvent in a degassing zone.

2. The process of claim 1 which additionally comprises
   (f) from 0.01 to 0.3 percent by weight relative to the weight of monomers (a) and (b) of a mercaptan.

3. The process of claim 2 wherein the mercaptan is selected from the group consisting of n-butyl mercaptan, n-octyl mercaptan, n-n dodecyl mercaptan and tertiary dodecyl mercaptan.

* * * * *

UNITED STATES PATENT AND TRADEMARK OFFICE
CERTIFICATE OF CORRECTION

PATENT NO. : 4,421,895

DATED : December 20, 1983

INVENTOR(S) : Adolf Echte et al

It is certified that error appears in the above-identified patent and that said Letters Patent is hereby corrected as shown below:

On the title page insert

Foreign Application Priority Data

-- December 16, 1980 (DE) Fed. Rep. of Germany 3047293 --

Signed and Sealed this

Fifth Day of June 1984

[SEAL]

Attest:

GERALD J. MOSSINGHOFF

Attesting Officer

Commissioner of Patents and Trademarks